United States Patent [19]

Yoshiyuki et al.

[11] Patent Number: 4,560,916
[45] Date of Patent: Dec. 24, 1985

[54] ALTERNATING CURRENT GENERATOR SYSTEM FOR A CAR

[75] Inventors: Iwaki Yoshiyuki; Matsumoto Akio; Yokota Mitsuyoshi, all of Himeji, Japan

[73] Assignee: Mitsubishi Denki Kabushiki Kaisha, Tokyo, Japan

[21] Appl. No.: 576,390

[22] PCT Filed: Jun. 1, 1983

[86] PCT No.: PCT/JP83/00177
§ 371 Date: Jan. 27, 1984
§ 102(e) Date: Jan. 27, 1984

[30] Foreign Application Priority Data

Jun. 2, 1982 [JP] Japan ............... 57-83085[U]

[51] Int. Cl.$^4$ ............... H02J 7/14; H02P 9/10
[52] U.S. Cl. ............... 322/86; 320/56; 320/61; 320/64; 322/88; 290/37 A
[58] Field of Search ............... 322/28, 59, 60, 86–88; 320/61, 56, 64, 67, 68; 123/179 B

[56] References Cited

U.S. PATENT DOCUMENTS

| | | | |
|---|---|---|---|
| 1,118,269 | 11/1914 | Creveling | 320/61 X |
| 3,086,161 | 4/1963 | DeCarbo et al. | 320/67 X |
| 3,246,232 | 4/1966 | Langston et al. | 322/60 |
| 3,444,946 | 5/1969 | Waterbury | 320/56 |
| 3,559,027 | 1/1971 | Arsem | 320/61 |
| 4,301,376 | 11/1981 | Ragaly | 322/88 X |

FOREIGN PATENT DOCUMENTS 1329552  9/1973  United Kingdom ............... 320/56

Primary Examiner—R. J. Hickey
Attorney, Agent, or Firm—Oblon, Fisher, Spivak, McClelland & Maier

[57] ABSTRACT

A field coil (2) is excited by a solar battery (9) attached on a car to use an alternating current generator as of a separately excited type and a battery (8) is supplementarily charged by the solar battery (9).

3 Claims, 3 Drawing Figures

FIGURE 1 *PRIOR ART*
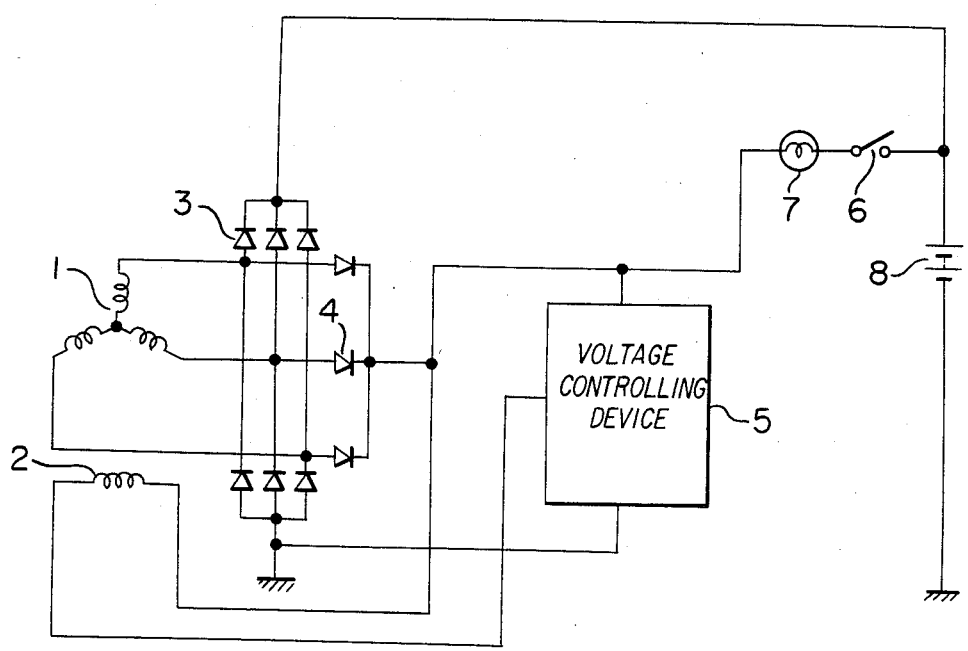
FIGURE 3
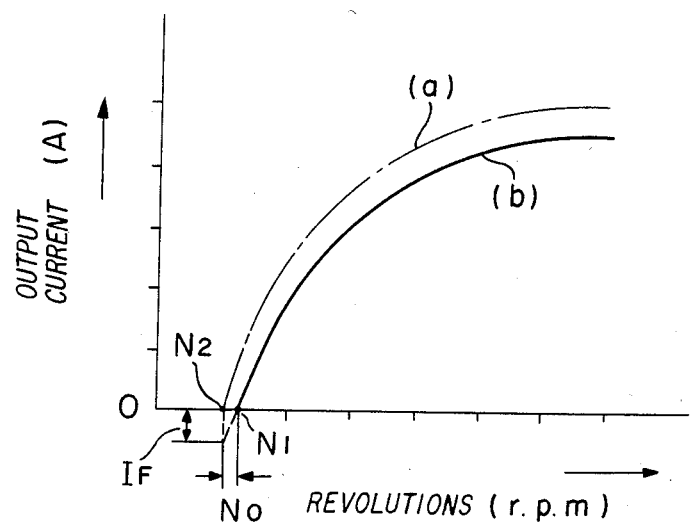

ALTERNATING CURRENT GENERATOR SYSTEM FOR A CAR

CROSS-REFERENCE TO COPENDING APPLICATIONS

Reference is made to copending applications having the same inventors as the present application, namely Ser. Nos. 576,387 and 576,388.

FIELD OF TECHNOLOGY

The present invention relates to an alternating current generator used for a car.

BACKGROUND OF TECHNOLOGY

FIG. 1 is a circuit diagram showing an embodiment of the conventional alternating current generator for a car. In the figure, the reference numeral 1 designates an armature coil having a three phase connection for generating an alternating current output and the numeral 2 designates a field coil, these parts constituting a three phase alternating current generator. The reference numeral 3 designates a main rectifying device for rectifying the alternating current output of the armature coil 1; the numeral 4 designates an auxiliary rectifying device for rectifying the alternating current output of the armature coil 1; the numeral 5 designates a voltage controlling device which turns on and off an exciting current passing to the field coil 2; the numeral 6 designates a key-switch; the numeral 7 designates a charge lamp connected to the key-switch 6 in series; and the numeral 8 designates a battery.

The positive side of the battery 8 charged by the output of the main rectifying device 3 is connected to the voltage controlling device 5 through a serial connection of the key-switch 6, a charge lamp 7 and the field coil 2. The output of the auxiliary rectifying device 4 is, on one hand, connected to the voltage controlling device 5 and is, on the other hand, connected to the voltage controlling device 5 through the field coil 2.

The operation of the circuit constructed as above-mentioned will be described.

First of all, when the key-switch 6 is closed, an exciting current is passed to the field coil 2 through a circuit of the positive (+) side of battery 8-key-switch 6-charge lamp 7-field coil 2-voltage controlling device 5-negative (−) side of battery 8. After this, when an engine is actuated for revolution whereby the terminal voltage of the generator increases, an exciting current is supplied from the auxiliary rectifying device 4 to the field coil 2 and the generator starts to generate power as a self-excited generator.

In such alternating current generator constructed as above-mentioned, however, a part of an output current is consumed as an exciting current to cause reduction in output for the exciting current corresponding to about ten percent of the output current of the generator and to cause consumption of excessive power of the engine disadvantageously.

SUMMARY OF THE INVENTION

In the present invention, a separately exciting means for exciting a field coil by a solar battery and a charging means for charging a battery by the solar battery are provided and the field coil is excited by the solar battery so that a generator is used as a separately excited generator and the battery is supplementarily charged by the solar battery.

In accordance with the present invention, an exciting current for a field coil is supplied from a solar battery requiring no consumption of energy from an engine whereby the following excellent effects are attainable: much output current is obtained in comparison with the conventional generator having the same size; the size of the generator is substantially reduced; and efficiency of the generator is improved. In addition to the effects as above-mentioned, further excellent effect that the ranking of the capacity of the generator can be lowered by, for instance, one grade since a battery is supplementarily charged by the solar battery during car stoppage.

BRIEF DESCRIPTION OF THE DRAWINGS

FIG. 1 is a circuit diagram of the conventional alternating current generator for a car;

FIG. 3 is a characteristic curve showing effect of the present invention in comparison with the conventional generator.

PREFERRED EMBODIMENT OF THE PRESENT INVENTION

Figure 2:
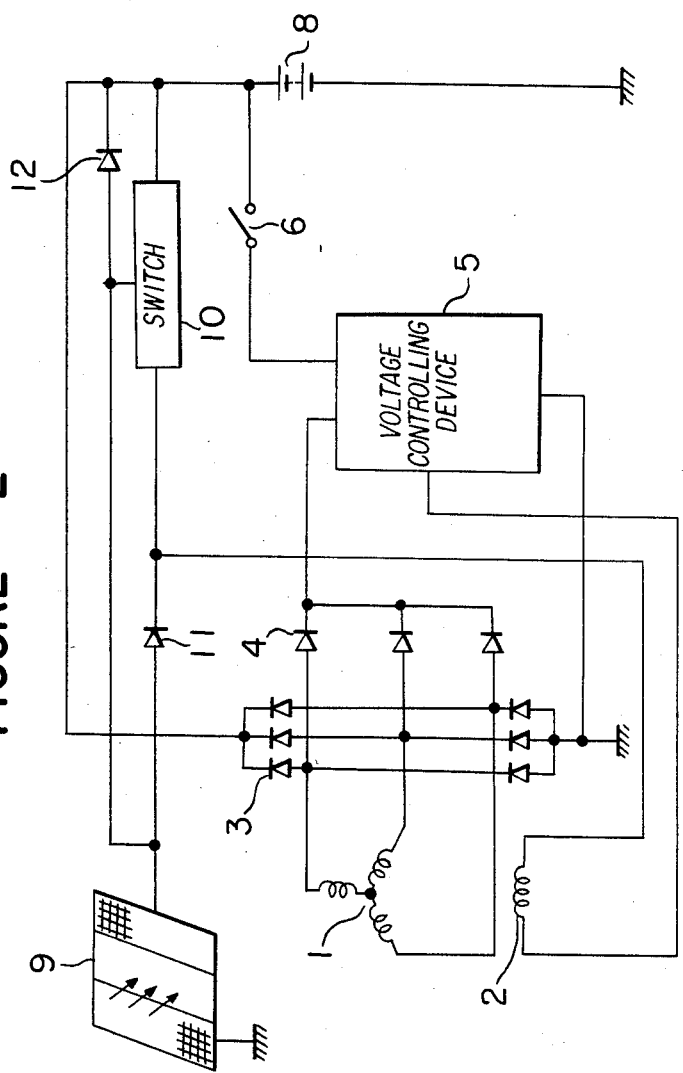
FIG. 2 is a circuit diagram of an embodiment of the alternating current generator for a car of the present invention.

FIG. 2 is a circuit diagram of an embodiment of the alternating current generator for a car of the present invention in which there is shown only parts necessary for description.

In FIG. 2, the same reference numerals as in FIG. 1 designate the corresponding part. The reference numeral 9 designates an array of solar batteries attached to the roof or the bonnet of a car; 10 designates a switch to detect a voltage produced in the solar battery array 9 to perform opening and closing operations; 11 and 12 respectively designate reverse current blocking diodes. The diode 11 is connected in the forward direction between the solar battery array 9 and the switch 10 while the diode 12 is connected in the forward direction between the solar battery array 9 and the battery 8.

The junction of the switch 10 and the diode 11 is connected to the voltage controlling device 5 through the field coil 2 and the positive side of the battery 8 whose negative side is grounded is connected to the switch 10 and is also connected to the voltage controlling device 5 through the key-switch 6.

The operation of the embodiment shown in FIG. 2 will be described. In case that a voltage produced by the solar battery array 9 is above a previously determined value, the switch 10 is opened whereby an exciting current is passed to the field coil 2 through the circuit of the solar battery array 9-diode-11 field coil 2-voltage controlling device-solar battery array 9. Then, when an engine is driven with the exciting current passing, the generator starts to generate power as a separately excited generator.

When the terminal voltage of the solar battery array 9 exceeds the terminal voltage of the battery 8, the battery is charged through the circuit of the solar battery array 9-diode 12-battery 8-solar battery array 9.

Thus, the exciting current is supplied to the field coil 2 from the solar battery array 9 and accordingly, as shown in the characteristic comparison diagram of FIG. 3 in which the abscissa denotes revolution (rpm) and the ordinate denotes output current A, the revolution at the time of starting generation of power in the characteristic curve (a) of the generator of the present invention is lowered by $No(=N_1-N_2)$ rpm in comparison with the characteristic curve (b) of the conventional generator and the output current is increased for an amount of the field current IF.

In case that sunshine is insufficient as in the condition of night, rainy weather and so on, there is formed a auxiliary circuit in such a manner that an exciting current flows in the field coil 2 through the circuit having a higher potential of the positive side of battery 8-switch 10-field coil 2-voltage controlling device 5-the negative side of battery 8.

INDUSTRIAL UTILITY

The present invention is applicable not only to an alternating current generator for a vehicle but also to a car such as a farm tractor, an industrial vehicle and so on.

We claim:

1. An alternating current generator system for a car, comprising:
   a field coil;
   an armature coil having a three-phase connection to generate an alternating current output;
   a rectifying device for rectifying the alternating current output from said armature coil;
   a battery to be charged with the output of said rectifying device;
   a voltage controlling device for turning on and off a field current passing through said field coil;
   a solar battery;
   a switch connected between said solar battery and said battery for comparing the voltage from the said solar battery to a threshold value and supplying said field current from said battery when said voltage is below said threshold value and supplying said field current from said solar battery when said voltage is above said threshold value;
   charging means for charging said battery from said solar battery;
   wherein said field current is supplied separately from said rectified output when said voltage from said solar battery exceeds said threshold value, so as to produce an increased output; and
   wherein said battery is charged when the voltage of said solar battery exceeds the voltage of said battery.

2. The alternating current generator system for a car according to claim 1, wherein said solar battery is attached to the bonnet of the car mounting said alternating current generator.

3. The alternating current generator system for a car according to claim 1, wherein said solar battery is attached on the roof of the car mounting said alternating current generator.

* * * * *